United States Patent [19]
Wetzel

[11] 4,174,849
[45] Nov. 20, 1979

[54] WHEELBARROW TYPE CARRIER

[76] Inventor: Alvin L. Wetzel, 1025 S. Stapley, Mesa, Ariz. 85204

[21] Appl. No.: 854,151

[22] Filed: Nov. 23, 1977

[51] Int. Cl.² ............................................. B62B 1/22
[52] U.S. Cl. ................................... 280/47.3; 414/457
[58] Field of Search ........................... 280/47.3, 47.23; 214/384, 377, 378, 379, 380, 382, 383, 381, 370, 373, 1 HH, DIG. 3, DIG. 4

[56] References Cited

U.S. PATENT DOCUMENTS

| | | | |
|---|---|---|---|
| 177,949 | 5/1876 | McKinney | 214/377 |
| 2,086,318 | 7/1937 | Jackson | 214/383 X |
| 2,729,351 | 1/1956 | Greeley | 214/384 |

FOREIGN PATENT DOCUMENTS 151918  11/1952  Australia .................................. 280/47.3

*Primary Examiner*—John A. Pekar
*Attorney, Agent, or Firm*—Cahill, Sutton & Thomas

[57] ABSTRACT

A carrier framework, configured to span the top of an item to be carried and terminating in a pair of handles, extends rearwardly from a rotatably mounted support wheel. Framework mounted prongs extend rearwardly of the wheel for engaging one end of the item and a pivotally mounted hook apparatus depends from the framework in proximity to the handles for engaging the other end of the item. In operation, the carrier is positioned to bring the prongs into penetrating engagement with the item whereafter the hook apparatus is pivoted into engagement; transport of the item is accomplished by raising the handles to lift the item off the ground and the carrier is pulled or pushed in wheelbarrow fashion.

4 Claims, 3 Drawing Figures

WHEELBARROW TYPE CARRIER

The present invention relates to carriers and, more particularly, to wheelbarrow-type carriers for heavy and/or bulky items.

Two band bales of hay generally weigh approximately 85 pounds and three band bales of hay weigh approximately 120 pounds. However, depending upon the moisture of the hay, the weight of the bales may vary substantially. During much of the handling of hay bales, power equipment is employed and the bulk and weight of the bales are not severe detrimental factors. However, on farms, ranches, stables, etc., manual transport of individual bales from one location to another is hard labor.

To alleviate, or in some cases even make possible, the transport of hay bales, various devices have been developed specifically for this purpose or otherwise useable for this purpose. U.S. Pat. No. 1,001,962 describes a wheeled bale hook for eliminating the need of carrying a bale. The use of this device still presents certain problems which include: lifting the bale sufficiently high to engage the hook; carefully balancing the bale upon the shank of the hook shank while the device is being pulled or pushed across the ground; and, the operator cannot walk upright while pushing or pulling upon the bale but must be bent over in order to balance the bale. U.S. Pat. No. 1,639,266 describes a wheeled staff from which a net enclosure extends. The items to be transported must be first lifted into the net whereafter pushing or pulling of the device can be effected to transport the items. A device of this type is impossible to use in conjunction with bales. U.S. Pat. No. 2,044,705 describes a carrier having matching rods with prongs extending therefrom for penetratingly gripping therebetween the item to be carried. This device necessarily requires two persons, one in front and one at the rear. U.S. Pat. No. 2,606,771 illustrates a wheelbarrow device which may be operated as a conventional wheelbarrow or which may be attached to the rear of a vehicle and serve as a trailer. It suffers from the difficulty of having to lift the item to be carried into the carrying bracket. U.S. Pat. No. 3,596,992 is directed to a wheel supported framework wherein the framework supportingly engages one end of an item to be transported. The other end of the item must be gripped by an operator to pull or push the item in wheelbarrow fashion.

The present invention is directed to a wheelbarrow-like carrier which engages and supports the item to be transported without the need for lifting the item onto the carrier. Quick connect/disconnect elements, which eliminate the need to raise or lift the item to effect connection/disconnection, are employed to engage the item. By incorporating the benefits of the mechanical advantage afforded by a lever, an operator can readily transport the item off ground from one location to another.

It is therefore a primary object of the present invention to provide a carrier for transporting heavy and bulky items from one location to another.

Another object of the present invention is to provide a wheelbarrow-like carrier having quick connect/disconnect means for transporting a bulky and/or heavy item.

Still another object of the present invention is to provide a bale carrier which incorporates bale engaging mechanisms to eliminate lifting of the bale of hay onto the carrier in order to transport the bale from one location to another.

Yet another object of the present invention is to provide a carrier for bales of hay useable by operators who are not sufficiently strong to lift a bale of hay.

A further object of the present invention is to provide a carrier for easily transporting a bale of hay through narrow doorways and upon narrow walkways.

A still further object of the present invention is to provide a carrier having prongs for penetrably engaging opposed ends of a bale of hay.

A yet further object of the present invention is to provide a carrier having fixed prongs for readily engaging/disengaging one end of a bale of hay and pivotable prongs for readily engaging/disengaging the other end of the bale of hay.

These and other objects of the present invention will become apparent to those skilled in the art as the description thereof proceeds.

The present invention may be described with greater specificity and clarity with reference to the following drawings, in which.

In the normal course of business of farms, ranches, stables, etc., it is mandatory to transport bales of hay from a stack of bales to the point of use. The transport of these bales presently involves very hard manual labor to lift and carry the bales which may weigh 120 pounds or more. The physical exertion involved is further exacerbated when narrow gates or doorways must be negotiated. Where vehicles, such as trucks, can be used, the bales of hay must still be lifted onto the truck and then pushed therefrom at the ultimate destination. To make transport of bales of hay even possible for those not strong enough to lift a bale of hay and to make such transport easier for anyone having to relocate a bale of hay, the carrier described hereinafter was conceived and reduced to practice.

Figure 1:
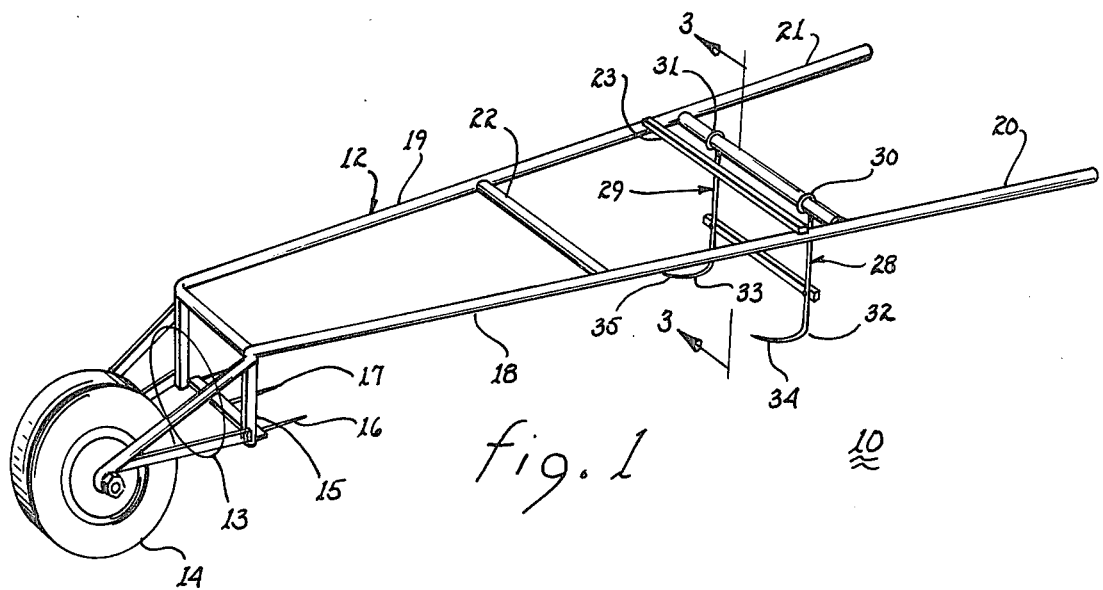
FIG. 1 is a perspective view of a hay bale wheelbarrow-type carrier.

Referring to FIG. 1, there is shown a carrier 10 which is of a wheelbarrow-type configuration and employs a lever arm to alleviate the lifting forces necessary. Framework 12 of the carrier includes a yoke 13 for supporting a journalled wheel 14. The exact shape and configuration of the yoke may be modified as necessary to meet specific requirements. Similarly, the size and journalled support for wheel 14 may be modified. Framework 12 includes a downwardly depending forward end 15. This end supports yoke 13 and rearwardly extending prongs 16 and 17. Two frame members 18, 19, extend rearwardly from end 15 and terminate at handles 20, 21, respectively. Braces, such as braces 22 and 23, extend intermediate frame members 18 and 19 to position them with respect to one another and add rigidity to framework 12.

Figure 2:
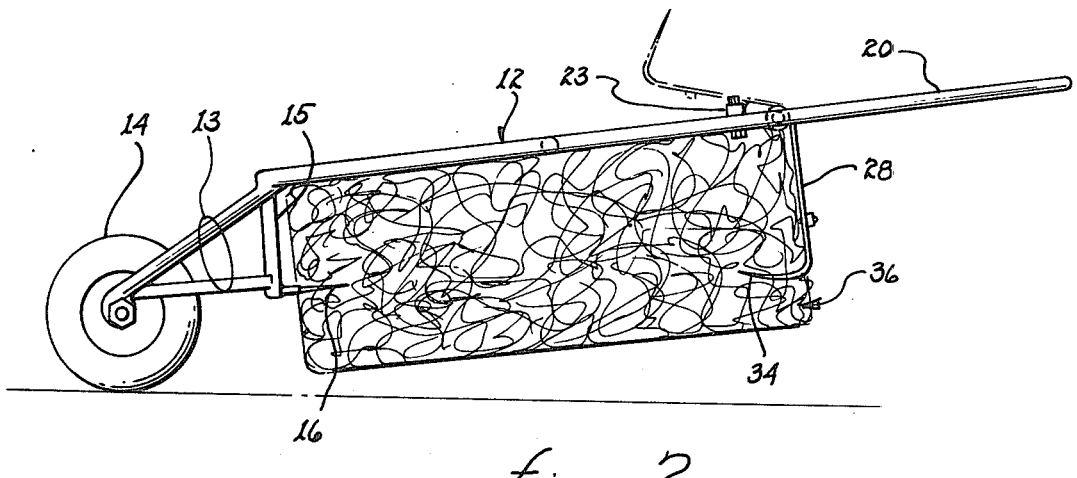
FIG. 2 is a side view illustrating a bale of hay transported by the carrier.
Figure 3:
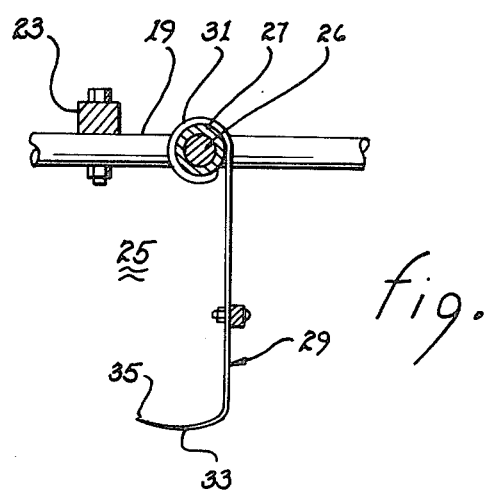
FIG. 3 is a cross-sectional view taken along lines 3—3, as shown in FIG. 1.

Pivoting hook mechanism 25 will be described with joint reference to FIGS. 1, 2 and 3. The mechanism includes a journal member 26 attached to and extending intermediate frame members 18 and 19. A cylindrical member or tube 27 is rotatably mounted upon journal member 26. A pair of hooks 28 and 29 are attached to and extend from tube 27. The upper end (30, 31) of each of the hooks may be curved in conformance with tube 27 and rigidly secured thereto by welds or other means.

A spacer 32 is attached to the shank of hooks 28 and 29 to add rigidity. The lower end (or prong 32, 33) of each hook extends toward prongs 16 and 17 and may include an upwardly extending tip (34,35) to lockingly engage and penetratingly retain one end of a bale of hay 36. Thereby, hooks 28 and 29 are pivotable as a unit about journal member 26. It may be noted that brace 23 serves as a support for the hooks when the latter are in the disengaged position (as noted by the dashed lines).

The operation of carrier 10 will be described with primary reference to FIG. 2. In order for an operator to avoid the physical exertion attendant lifting and transporting a bale of hay, such as bale 36, carrier 10 may be employed. The carrier is brought into engagement with the bale in the following manner. First, hooks 28 and 29 are pivoted upwardly, as indicated in dashed lines. Second, the carrier is maneuvered to place framework 12 over and in general alignment with the bale. Third, end 15 is placed in front of one end of the bale and the carrier is drawn rearwardly until prongs 16 and 17 penetratingly engage the adjacent end of the bale. Fourth, framework 12 is lowered until it rests upon the top surface of the bale, whereupon hooks 28 and 29 are pivoted rearwardly and downwardly until the tips of the hooks penetratingly engage the other end of the bale and the shanks of the hooks are generally adjacent the bale.

To transport bale 25, handles 20 and 21 are raised, which action causes the carrier to pivot about wheel 14 and raises engaged bale 36. By well known principles of lever arms, the amount of lifting force required is substantially less than the force of gravity acting upon the bale. Consequently, those persons physically incapable of lifting a bale can do so with carrier 10. In fact, children as young as 10 years old and of normal physical development can easily transport a three band bale of hay with the carrier.

Discharge of the bale being carried is a straight-forward matter of lowering framework 12 until the bale rests upon the ground. Thereafter, hooks 28 and 29 can be disengaged by pulling upon spacer 32 to withdraw the ends of the hooks from within the bale. On pivoting of the hooks to the position indicated in dashed lines in FIG. 2, frame 12 can be pushed forwardly to effect disengagement of prongs 16 and 17 from the bale. Thus, a bale can be engaged, transported to its final destination and disengaged without every having to directly lift the bale.

Although bale 36 is illustrated as having its longitudinal axis in general alignment with the longitudinal axis of carrier 10, such alignment is not necessary. That is, prongs 16 and 17 can be employed to penetratingly engage one side of the bale with hooks 28 and 29 engaging the opposite side. Necessarily, the point of attachment of hooks 28 and 29 would have to be closer to prongs 16 and 17 than indicated in the drawings. Alternatively, a second pivoting hook mechanism could be employed to permit the transport of differently sized bales or transport of a bale sideways rather than endways. Whichever set of hooks were not presently in use would be pivoted upwardly out of the way to the position as indicated by the dashed lines in FIG. 2.

While the present invention was developed for the purpose of aiding in the transport of bales of hay, it is to be understood that its use is not necessarily limited thereto. By modifying prongs 16 and 17 and hooks 28 and 29 into gripping elements of other configurations, any kind of item or container can be lifted and transported with my carrier. A side benefit of my carrier is that the item to be lifted and transported need only be raised sufficient for ground clearance. Thus, should the operator stumble or trip, the fall is minimal and damage or injury to the carried item would be negligible, if any.

Moreover, there is no problem of having the item potentially fall upon or injure the operator, as is presently true when one attempts to carry a bale of hay. The wheel-barrow-like configuration of my carrier is just as easily pushed or pulled, which renders movement within confined spaces very easy. Additionally, any opening just sufficiently wide to accommodate handles 20 and 21 and the item being carried is readily and easily negotiated.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A carrier for transporting a bale of compacted resilient material, which item is penetrably accessible to prong means, said carrier comprising in combination:
    (a) a framework having a forward end and a rear end;
    (b) intermediate frame member means disposed between the forward end and the rear end for stabilizing the bale against rotation along a fore and aft axis of said framework by juxtapositioning of said bale with said intermediate frame member means upon engagement of said carrier with the bale;
    (c) a wheel rotatably attached to the forward end of said framework for supporting the forward end of said framework during transport of said carrier across the ground;
    (d) prong means extending rearwardly from the forward end of said framework for penetrably supportingly engaging the material of the bale through the face of one end of the bale;
    (e) a pivotable prong means pivotally depending from said framework for penetrably and supportingly engaging the face of another end of the bale, whereby said prong means and said pivotable prong means support in concert the bale in a depending relationship to said framework; and
    (f) handle means disposed at the rear end of said framework for pivoting said framework about said wheel and applying a force to transport the framework supported bale across the ground.

2. The carrier as set forth in claim 1 wherein said prong means comprises a pair of prongs and said pivotable prong means comprises a pair of hooks journalled upon said framework.

3. The carrier as set forth in claim 2 wherein said intermediate members are located above said prong means and said pivotable prong means to be juxtaposed with the top surface of the bale.

4. The carrier as set forth in claim 3 wherein said intermediate frame member means comprises a pair of laterally displaced members extending from the forward end to the rear end of said framework.

* * * * *